United States Patent Office 3,164,568
Patented Jan. 5, 1965

---

3,164,568
POLYURETHANES FROM ESTERIFIED OR AMIDATED POLYETHERS
Herbert Nordt, Leverkusen, and Günther Loew, Cologne, Germany, assignors of one-half to Farbenfabriken Bayer Aktiengesellschaft, Leverkusen, Germany, a corporation of Germany, and one-half to Mobay Chemical Company, Pittsburgh, Pa., a corporation of Delaware
No Drawing. Filed Nov. 18, 1958, Ser. No. 774,611
Claims priority, application Germany Nov. 22, 1957
4 Claims. (Cl. 260—75)

This invention relates to the preparation of polyurethane plastics and, more particularly, to the preparation of polyurethane plastics from the combination of modified polyhydric polyethers and organic polyisocyanates.

The reaction between organic polyisocyanates and polyhydric polyethers having at least two hydrogens reactive with an —NCO group to form polyurethane plastics is well-known. However, the polyhydric polyethers with predominately secondary hydroxyl groups and their combinations with polyisocyanates have such low viscosity and such low reactivity that they are not technically useful to prepare homogeneous or porous plastics. For example, useable lacquer coatings cannot be prepared from polyisocyanates and polypropylene ether alcohols obtained from the addition of propylene oxide to, for example, glycerine.

Further, the polyhydric polyethers with predominately secondary hydroxyl groups cannot be used in the formation of polyurethane foams by the conventional procedure in a one-step process in which a polyhydric compound, a polyisocyanate and an activator mixture containing water, an accelerator and/or a cross-linking agent are combined. Heretofore, to obviate the processing difficulties which arise when using polyhydric polyethers in such a process, polyisocyanate-containing initial adducts have been prepared from the polyhydric polyethers in a first step and then these initial adducts have been mixed with the activator mixture in a second step, separate in time from the formation of the initial adduct, and converted into cellular polyurethane plastics.

Also, in contrast to the polyester-polyisocyanate combination, the polyhydric polyethers cannot usually be combined with polyisocyanates to form useable adhesive bonds. When using equivalent quantities of polyester-polyisocyanate and polyhydric polyether-polyisocyanate based on existing hydroxyl and —NCO groups, in separate tests, no serviceable bonds were obtained from the polyhydric polyether, whereas the bonds from the polyester were good. Thus, as in the cellular polyurethane plastic field, it is advantageous also in the adhesive field to employ initial adducts containing isocyanate.

It is an object of this invention to provide a process for the preparation of polyurethane plastics from condensation products of alkylene oxides having secondary hydroxyl groups without the necessity of preparing an isocyanate-terminated prepolymer in a preliminary step. It is another object of this invention to provide a process for the preparation of polyurethane plastics from polyisocyanates and polyhydric polyethers initially containing predominately secondary hydroxyl groups. It is a further object of this invention to provide a process for the preparation of cellular polyurethane plastics from polyisocyanates and polyhydric polyethers in a one-step process. Another object of this invention is to provide a process for the preparation of polyurethane plastic adhesives. Still, another object of this invention is to provide a process for the preparation of lacquer coatings from polyisocyanates and polyhydric polyethers with improved viscosity and reactivity.

The foregoing objects and others, which will become apparent from the following description are accomplished in accordance with this invention, generally speaking, by substitution in the preparation of polyurethane plastics from organic polyisocyanates and organic compounds having at least two hydrogens reactive with an —NCO group, of polyhydric polyethers having predominately secondary hydroxyl groups modified to contain predominately primary hydroxyl or amino groups.

The invention thus contemplates an improved process for making a polyurethane plastic wherein an organic polyisocyanate is reacted with a condensation product of a polyhydric polyether, originally having terminal secondary hydroxyl groups, which have been modified by reaction with a polycarboxylic acid and then reacting the resulting carboxyl terminated adduct with a polyhydric alcohol, a polyfunctional amine or an amino alcohol.

The modified polyhydric polyethers used by the process of this invention in the preparation of polyurethane plastics are more particularly condensation products of alkylene oxides with predominately secondary hydroxyl groups and an average molecular weight of at least 200 and, preferably not more than about 10,000 as have been modified by way of ester bonds and/or amide bonds to compounds with primary hydroxyl groups or amino groups having at least one free hydrogen atom. By the use of the modified polyhydric polyethers in accordance with the improved process of the present invention, those features of the polyhydric polyethers having predominately secondary hydroxyl groups, which were disadvantageous in many applications of the polyisocyanate addition process, such as, the unfavorable viscosity and reactivity properties of lacquer coatings, are eliminated in a convenient manner. The modified polyhydric polyethers of this invention in every case contain primary hydroxyl or amino groups.

Any polyhydric polyether containing secondary hydroxyl groups and having a molecular weight of at least about 200 and preferably, not more than about 10,000 may be used as starting materials for the preparation of the modified polyhydric polyethers of this invention. Examples of polyhydric polyethers which may be used are the lower polyalkylene ether glycols with predominately secondary hydroxyl groups, such as, polypropylene ether glycols and polybutylene ether glycols, such as are obtained, for example, from 1,2 butylene oxide, 1,3 butylene oxide and propylene oxide. Polyhydric polyethers with a molecular weight of approximately at least 300 and, preferably not greater than about 3,000 are preferred. Also operable for the preparation of the modified polyhydric polyethers of the present invention are those obtained from co-polymers, for example, those of propylene oxide with ethylene oxide or ethylene oxide derivatives, provided they have predominately secondary hydroxyl groups. Branched polyhydric polyethers, such as those obtained by adding alkylene oxides to polyhydric alcohols, for example, trimethylol propane, may also be used to prepare the modified polyhydric polyethers.

Thus, in the process of this invention, linear or branched polyhydric polyethers having predominately secondary hydroxyl groups are converted by ester and/or amide bonds into compounds having terminal primary hydroxyl groups or amino groups with at least one free hydrogen atom. For example, the polyhydric polyethers with predominately secondary hydroxyl groups can be converted by way of esterification with dicarboxylic acids or higher polycarboxylic acids or their derivatives, in a quantity which corresponds to the existing hydroxyl groups in the polyhydric polyether with predominately secondary hydroxyl groups to polyhydric polyethers with terminal carboxyl groups. These intermediates can then be esterified, trans-esterified, or amidated with dihydroxy or higher polyhydroxy compounds, with amino alcohols or with diamines and the like, to form linear or branched polyhydric polyethers with terminal primary hydroxyl groups or amino groups.

Any suitable carboxylic acid may be used. Thus, one may use dicarboxylic or higher polycarboxylic acids of the aliphatic and aromatic series. For example, one may use succinic acid, adipic acid, sebacic acid, and the dimeric linoleic acids, phthalic acids, isophthalic acid, and terephthalic acid. The derivatives of these carboxylic acids may also be used, such as their anhydrides or their esters with monoalcohols, for example, dimethyl or other polymethyl esters. Trifunctional carboxylic acids may also be used. Thus, one may use butane-1,2,4-tricarboxylic acid or benzene tricarboxylic acid. In addition, hydroxy carboxylic acids, such as, glycollic acid or unsaturated acids, such as, maleic acid, fumaric acid or derivatives thereof may also be used.

Any polyhydric alcohol or hydroxyl terminated polyether or polyester may be used for the alcoholic esterification or trans-esterification of the carboxyl terminated intermediates, more particularly described above. For example, the alkylene glycols, such as, ethylene glycol, diethylene glycol, polyethylene glycols of low molecular weight, butanediols, etc. the triols, such as trimethylol propane, trimethylol ethane, 1,2,6-hexanetriol and others, such as, pentaerythritol, sorbitol, mannitol, etc. are useful in the process of the present invention to prepare substances of exceptional reactivity and viscosity. Also, the polyhydric alcohols disclosed in United States reissue patent specification No. 24,514 may be used.

If high molecular weight substances having terminal amino groups are desired for use in the polyisocyanate poly-addition process, the intermediate compounds containing terminal carboxyl groups may be condensed with any suitable amine. For example, diamines, polyalkylene diamines, or amino alcohols may be used. Thus, representative amines that may be used are ethylene diamine, hexamethylene diamine, diethylene triamine, and aminoethanol.

The modification of the polyhydric polyethers having secondary hydroxyl groups is effected in stages in a convenient, known manner. It may be carried out by first heating the polyhydric polyether containing predominately secondary hydroxyl groups with the dicarboxylic acids or their derivatives at atmospheric pressure to temperatures between about 130 and 230° C. until the acid number of the products is not further reduced or no more monomeric alcohol is distilled off. Esterification or amidation may thereafter be carried out with alcoholic components, at atmospheric pressure or reduced pressure in the temperature range of about 130° to 230° C. until the acid number of the reaction products or the hydroxyl content of the reaction mixture has dropped to the desired level. The final acid number of the modified polyhydric polyethers should not be greater than about 5.

The modified linear or branched polyhydric polyethers containing terminal primary hydroxyl groups or amino groups with at least one free hydrogen atom, obtained in this way, have a viscosity in the range of from about 300 to about 10,000 cp./75° C. The modified polyhydric polyethers have a molecular weight of at least about 500 and an hydroxyl number preferably not greater than about 225. Due to their terminal hydroxyl or amino groups, the modified polyhydric polyethers have improved reactivity with respect to isocyanate groups as compared with the unmodified polyalkylene ether glycols. This reactivity is demonstrable in the preparation of cellular polyurethanes containing urethane groups produced by the reaction of water in a one-step process, whereas it was previously necessary to use a two-step process with the unmodified polyalkylene ether glycols. Thus, when using the modified polyhydric polyethers in the preparation of polyurethane plastics, it is unnecessary to produce an isocyanate-terminated prepolymer in a preliminary step.

The conversion of the modified polyhydric polyethers with terminal primary hydroxyl groups or amino groups by reaction with organic polyisocyanates to prepare various types of polyurethane plastics, is effected in a manner well-known to those skilled in the art.

Any organic polyisocyanate may be used in the process of this invention. Specific examples of polyisocyanates, however, are tetramethylene diisocyanate, hexamethylene diisocyanate, m-xylylene diisocyanate, p-xylylene diisocyanate, 4,6-dimethyl-1,3-xylylene diisocyanate, cyclohexane-1,4-diisocyanate, dicyclohexyl methane-4,4'-diisocyanate, m-phenylene-diisocyanate, p-phenylene diisocyanate, 1-alkylene-benzene-2,4-diisocyanates, 3-(alpha-isocyanatoethyl)-phenyl isocyanate, 1-alkyl-benzene-2,6-diisocyanates, 2,6-diethyl benzene-1,4-diisocyanate, diphenyl methane-4,4'-diisocyanate, diphenyl dimethyl methane-4,4'-diisocyanate, 3,3'-dimethoxydiphenyl methane-4,4'-diisocyanate and naphthalene-1,5-diisocyanate. Also, the trifunctional polyisocyanates and those of higher function may be used, for example, 1-methyl benzene-2,4,6-triisocyanate, reaction products of, for example, 1 mol of a trihydric alcohol with 3 mols of a diisocyanate and other polyisocyanates such as those named in United States reissue patent specification No. 24,514. In addition, diisocyanates containing urethdione groups and those isocyanates in which the isocyanate group is blocked with a component which can be split off, for example, with phenols, and which only split off this component to liberate —NCO groups on being heated may also be used.

Any suitable catalyst may be used in polyisocyanate addition reaction.

Depending on the proposed use, the conversion of the modified linear or branched polyhydric polyethers to be used according to the invention can be effected with a deficiency, with equivalent quantities or with an excess of polyisocyanates, and, if desired, cross-linking agents can be added in a manner known to those skilled in the art. When using water as the cross-linking agent cellular polyurethanes are obtained.

In accordance with these methods of procedure which are well known to those skilled in the art, it is also possible according to the invention, when starting from polyalkylene oxides, to produce, without any difficulty, useful porous or homogeneous elastic or rigid plastics, lacquer coatings, adhesives, textiles, rubbers, covering materials, etc.

The term "polyhydric polyether" as used herein refers to polyethers obtained from alkylene oxides or glycols or from other heterocyclic ethers, such as dioxolane, by polymerization or addition reactions with polyhydric alcohols, aminoalcohols, etc.

The following examples are presented to further illustrate the invention.

*Example 1* about 2000 parts by weight of a linear polypropylene oxide (average molecular weight 665, OH content 5.1%) are heated with about 935 parts by weight of adipic acid to about 160° C. while stirring at normal pressure. Over a period of some hours, the temperature is raised to approximately 200° C. until the acid number of about 135 no longer shows any change. After cooling to about 150° C., approximately 210 parts by weight of diethylene glycol and about 246 parts by weight of trimethylol propane are added, and esterified in an inert gas atmosphere while gradually raising the temperature to about 200° C. and subsequently applying vacuum to a pressure of about 15 mm. Hg, the esterification being continued until the acid number has dropped to about 1.5. A modified polypropylene oxide with an OH content of 2.0%, and having a viscosity of about 960 cp./75° C. is obtained.

About 100 parts by weight of the modified polypropylene oxide obtained in this way are mixed with about 30 parts by weight of tolylene diisocyanate, about 0.8 part by weight of ethoxy dimethyl propylamine, about 0.2 part by weight of permethylated diethylene triamine and about 2 parts by weight of water.

The mixing can be carried out on a continuously operating mixer, such as that described by way of example in United States reissue patent specification No. 24,514. An elastic foam material having a bulk density of 45 kg./m.³ is obtained.

If 100 parts by weight of an unmodified linear polypropylene oxide with an OH content of 2.0% are mixed with 30 parts by weight of toluylene diisocyanate, 0.8 part by weight of ethoxydimethyl propyl amine, about 0.2 part by weight of permethylated diethylene triamine and about 2 parts by weight of water, the mixture will not expand and harden to give a technically useful foam.

*Example 2*

About 2000 parts by weight of a linear polypropylene of trimethylol propane, i.e., a branched polypropylene oxide (average molecular weight 1160, OH content 2.9%) and about 505 parts by weight of adipic acid are heated at 160–200° C. in an inert gas atmosphere until an acid number of about 89 is reached. After cooling to about 150° C., a mixture of about 156 parts by weight of diethylene glycol and about 133 parts by weight of trimethylol propane are added and the mixture is then esterified in the temperature range of 170 to 200° C., initially at normal pressure and later in vacuo, while distilling off the water of reaction. A viscous product of high molecular weight which has an acid number of about 1.4, an OH content of about 1.9%, and a viscosity of about 2260 cp./75° C. is obtained.

About 100 parts by weight of the branched modified polypropylene oxide obtained in this way are mixed with about 30 parts by weight of tolylene diisocyanate, about 1 part by weight of ethoxy dimethyl propylamine, about 0.1 part by weight of permethylated diethylene triamine, about 0.4 part by weight of paraffin oil and about 2 parts by weight of water. The mixing can be carried out on a continuously operating mixer, such as that described by way of example in United States reissue patent specification No. 24,514.

The result is an elastic foam material having a bulk density of 45 kg./m.³.

If 100 parts by weight of the branched unmodified propylene oxide having an OH content of 1.9% are mixed with about 30 parts by weight of toluylene diisocyanate, about 1 part by weight of ethoxymethyl propyl amine, about 0.1 part by weight of permethylated diethylene triamine, about 0.4 part by weight of paraffin oil and about 2 parts by weight of water, the mixture will not expand and harden to give a technically useful foamed product.

*Example 3*

About 10,000 parts by weight of a linear polypropylene oxide (average molecular weight 2000, OH number 56) are heated with about 1375 parts by weight of adipic acid to 140–200° C. while distilling off the water of condensation until the reaction product shows an acid number of 58. After cooling to about 150° C. approximately 830 parts by weight of ethylene glycol are added. Esterification is proceeded while gradually raising the temperature to about 200° C. and subsequently applying vacuum to a pressure of about 15 mm. Hg. The esterification is continued until the acid number has dropped to about 1.3. Excess ethylene glycol is distilled off. The resulting OH number is 56. A clear liquid is obtained having a viscosity of about 990 cp./75°.

100 parts by weight of the modified polypropylene oxide are dehydrated for two hours at 135° C. at 25 mm. Hg and then mixed at 90° C. with 35 parts by weight of 4.4′-diphenyl methane diisocyanate. After 6 minutes the temperature does no longer rise. 8 parts by weight of hydroquinone dihydroxy ethyl ether (molten at 125° C.) are stirred into the reaction mixture which is then poured into waxed molds heated to 100° C. The molding solidifies within 40 minutes and can then be taken out of the mold. The molding is after-heated for 20 hours at 100° C. The moldings are useful as siphons, dust covers, oil resistant clutch rings, and the like.

The material exhibits the following mechanical properties:

| | | |
|---|---|---|
| Tensile strength | kg./cm.² | 210 |
| Elongation at break | percent | 380 |
| Permanent elongation | do | 6 |
| Shore hardness | degrees | 72 |
| Load at 300% elongation | kg./cm.² | 160 |
| Structural strength | kg./cm. | 25 |
| Swelling in mineral oil | percent | 1.8 |

*Example 4*

About 1000 parts by weight of a polypropylene oxide (average molecular weight 2000, OH number 56) and about 137.5 parts by weight of adipic acid are heated at 140–200° C. in an inert gas atmosphere until an acid number of about 51 is reached. After cooling to about 150° C. 871 parts by weight of amino ethanol are added and the mixture is then esterified at about 200° C. initially at normal pressure and later in vacuo until the acid number has dropped to about 1.5.

About 100 parts by weight of the modified polypropylene oxide obtained by this way (viscosity 1567 cp./25° C.) are mixed with about 30 parts by weight of toluylene diisocyanate, about 1 part by weight of ethoxydimethyl propyl amine, about 0.1 part by weight of permethylated diethylene triamine, about 0.4 part by weight of paraffin oil and about 2 parts by weight of water. The mixing can be carried out on a continuously operating mixer.

The result is an elastic foam material having a bulk density of 46 kg./m.³.

Although the invention has been described in considerable detail in the foregoing for the purpose of illustration, it is to be understood that such detail is solely for the purpose of illustration and that variations can be made therein by those skilled in the art without departing from the spirit and scope of the invention.

Although linear and branched polypropylene oxides were used in the examples, it is to be understood that other polyhydric polyethers, such as the lower polyalkylene ether glycols, polybutylene ether glycols or copolymers of propylene oxide with ethylene oxide, for example, could have been used. Also, the use of adipic acid in the examples was a matter of choice and the other carboxylic acids disclosed, such as, sebacic acid or succinic acid could have been used instead. Further, the polyhydric alcohols used in the examples, ethylene glycol and trimethylol propane could have been replaced by other alkylene glycols or hydroxyl terminated polyethers or polyesters, such as, 1,2,6-hexanetriol, butanediol, etc. The use of tolylene diisocyanate was a matter of choice and the other organic polyisocyanates disclosed above, such as, hexamethylene diisocyanate and m-xylylene diisocyanate could have been used with equally satisfactory results.

What is claimed is:

1. A method for making a polyurethane plastic which comprises reacting an organic polyisocyanate with a polyhydric polyalkylene ether having a molecular weight of at least about 500, a hydroxyl number of not more than about 225 and being predominately terminated in groups selected from the class consisting of primary amino and primary hydroxyl groups, said polyalkylene ether having been prepared by reacting the secondary hydroxyl groups of a polyalkylene ether having a molecular weight of at least about 200 with a polycarboxylic acid and then esterifying the resulting terminal carboxyl groups with a member selected from the class consisting of polyhydric alcohols having primary hydroxyl groups and free from amino groups, amines having at least one free hydrogen atom but free from hydroxyl groups, and amino alcohols having primary amino groups and primary hydroxyl groups.

2. The process of claim 1 wherein the polyalkylene ether is a polyalkylene ether glycol.

3. The process of claim 1 wherein the polycarboxylic acid is adipic acid and the product of the reaction with the adipic acid is esterified with a mixture of a diethylene glycol and trimethylol propane.

4. The product of the process of claim 1.

References Cited in the file of this patent

UNITED STATES PATENTS

| | | |
|---|---|---|
| 2,512,722 | Lanham | June 27, 1950 |
| 2,723,283 | De Groote | Nov. 8, 1955 |
| 2,843,569 | Benning et al. | July 15, 1958 |
| 2,894,919 | Simon et al. | July 14, 1959 |
| 2,981,712 | Harper | Apr. 25, 1961 |
| 3,019,212 | Parker | Jan. 30, 1962 |